(12) United States Patent
O'Hara et al.

(10) Patent No.: US 8,838,494 B2
(45) Date of Patent: Sep. 16, 2014

(54) TARGET OUTCOME FUND

(75) Inventors: Matthew Arnold O'Hara, San Francisco, CA (US); Wei Li, Berkeley, CA (US)

(73) Assignee: BlackRock Institutional Trust Company, N.A., San Francisco, CA (US)

( * ) Notice: Subject to any disclaimer, the term of this patent is extended or adjusted under 35 U.S.C. 154(b) by 10 days.

(21) Appl. No.: 13/460,562

(22) Filed: Apr. 30, 2012

(65) Prior Publication Data

US 2012/0330796 A1    Dec. 27, 2012

Related U.S. Application Data

(60) Provisional application No. 61/480,378, filed on Apr. 29, 2011.

(51) Int. Cl.
*G06Q 40/00* (2012.01)
*G06Q 40/04* (2012.01)
*G06Q 40/06* (2012.01)

(52) U.S. Cl.
CPC ............... *G06Q 40/04* (2013.01); *G06Q 40/06* (2013.01)
USPC .......................................... 705/36 R; 705/35

(58) Field of Classification Search
None
See application file for complete search history.

(56) References Cited

U.S. PATENT DOCUMENTS

| | | | |
|---|---|---|---|
| 7,099,838 B1 | 8/2006 | Gastineau et al. | |
| 7,571,130 B2 | 8/2009 | Weber et al. | |
| 7,574,399 B2 | 8/2009 | Weber et al. | |
| 7,937,316 B2 | 5/2011 | Friedman et al. | |
| 2001/0025266 A1 | 9/2001 | Gastineau et al. | |
| 2003/0144947 A1 | 7/2003 | Payne | |
| 2005/0246260 A1* | 11/2005 | Hodgdon et al. | 705/36 |
| 2009/0076980 A1* | 3/2009 | Ameriks et al. | 705/36 R |
| 2011/0131150 A1* | 6/2011 | Golden | 705/36 R |

OTHER PUBLICATIONS

U.S. Appl. No. 61/142,609, filed Jan. 5, 2009.

* cited by examiner

*Primary Examiner* — Ryan Zeender
*Assistant Examiner* — Denisse Ortiz Roman
(74) *Attorney, Agent, or Firm* — Fenwick & West LLP

(57) ABSTRACT

A target outcome fund mimics an option in an underlying risky asset by holding a mix of the risky asset and a low-risk asset. The relative amount of the risky asset and the low risk asset held by the fund is periodically (e.g., monthly) rebalanced based on the fund's performance. If the fund overperforms, the target outcome is increased accordingly to prevent the fund becoming overly invested in the risky asset, thereby protecting gains made.

16 Claims, 3 Drawing Sheets

TARGET OUTCOME FUND

CROSS-REFERENCE TO RELATED APPLICATIONS

This application claims the benefit of U.S. Provisional Patent Application No. 61/480,378, filed on Apr. 29, 2011, which is hereby incorporated by reference in its entirety.

BACKGROUND

This invention relates generally to financial services and products, and more particularly to funds that are managed with a goal of achieving a predefined dollar amount at a future date, while providing a potential upside return.

Various investment options exist for defined contribution plans and other retirement accounts. Lifecycle funds, for example, follow a preset allocation path over a participants' lifetime as they approach a predefined target or horizon date. This preset allocation is typically based on a model of expected labor income and investment risk and return. The most common goal for these funds is maximization of investment efficiency (information ratio).

Existing investment products do not follow an investment strategy that attempts to achieve a predefined dollar amount at a specified future date. Thus, while the existing market provides different products for investors with different risk and reward trade-offs, there is a lack of products for investors who desire to target a specific outcome, rather than attempt to maximize potential and take the risks associated therewith. Such an investment product may be desirable in retirement accounts as well as other types of accounts (e.g., college savings accounts), where the investor can reasonably determine a target value they wish the fund to acquire, and where achieving that target is likely to be more important to the investor than maximizing investment potential.

SUMMARY

A method for managing a target outcome fund that converts projected returns into an explicitly stated outcome is disclosed. In particular, the target outcome fund is managed so that the investment reaches a specific dollar amount at a specific point in the future, while also providing a potential upside return.

In one embodiment, the target outcome fund holds a risky asset and a low-risk asset and is managed using an investment strategy that approximates a call option payout for the risky asset. The method generally involves the fund holding a balance of the risky and low-risk asset and periodically rebalancing the relative amount of each asset held. By mimicking a call option, the target outcome fund may be expected to reach (or approximately reach) a specific dollar amount at a specific point in the future. Moreover, this strategy may be implemented without holding the actual option itself, as derivatives can be undesirable or disallowed for certain accounts (such as a 401(k) retirement account). In one embodiment, the fund increases the allocated investment in the low-risk asset if the fund over-performs, a so-called "ratchet" technique, thereby locking in gains.

Due to the uncertain outcome of investment returns, the target outcome cannot be guaranteed; however, the likelihood of reaching the target outcome can be significantly increased by following embodiments of the investment approach described herein.

BRIEF DESCRIPTIONS OF THE DRAWINGS

DETAILED DESCRIPTION

Figure 1:
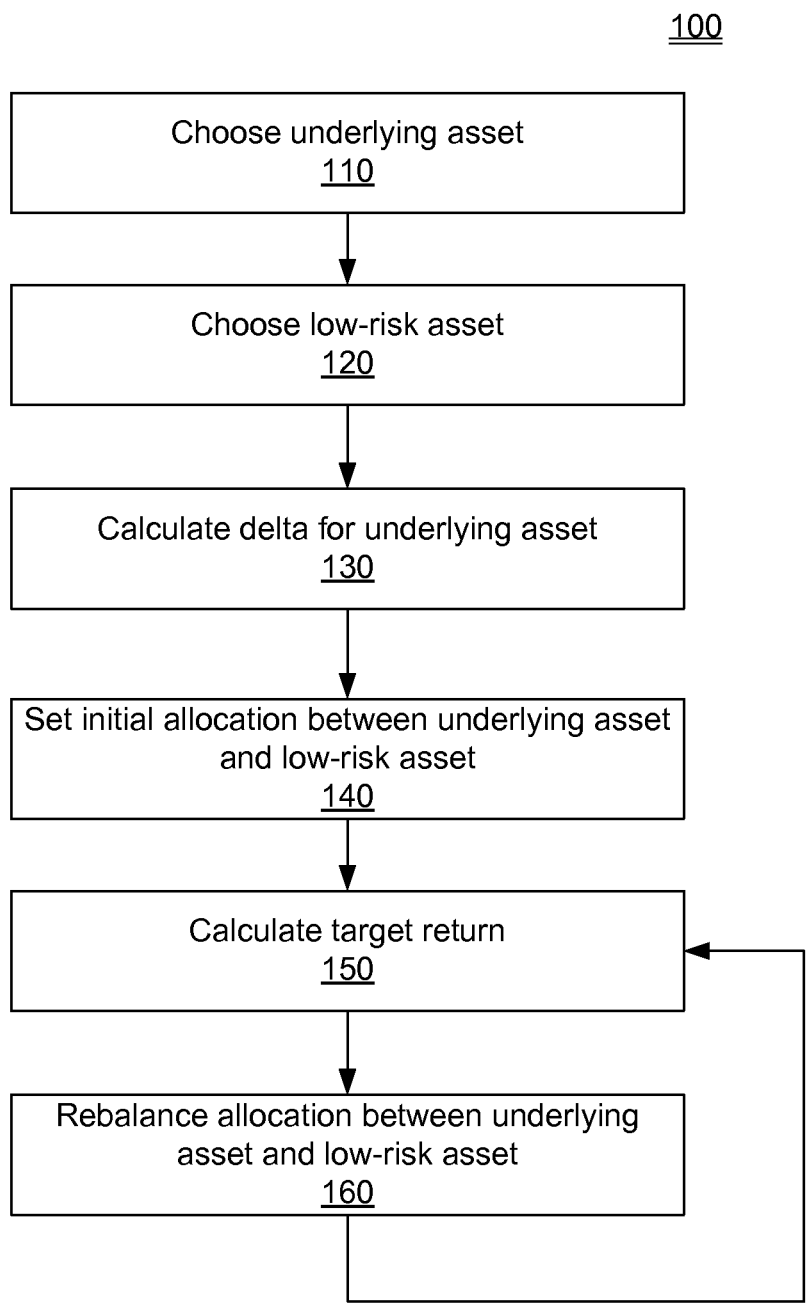
FIG. 1 is a flow chart illustrating a method for managing a target outcome fund, in accordance with an embodiment.

In accordance with an embodiment of the invention, a target outcome fund is managed based on an observation from option theory such that the final value of the fund is likely to be in close proximity to a predefined target outcome. According to option theory, the results of holding an option in an underlying asset can be mimicked by dynamically balancing the proportion of the underlying asset and a risk-free asset in the fund's portfolio. In particular, the results of holding an option can be mimicked by maintaining the portfolio such that the proportion of the fund that is invested in the underlying asset is equivalent to the option's "delta" (which is constrained to be between 0 and 1) with the balance being invested in the risk-free asset.

The delta of an option is defined to be the option's effective exposure to the underlying asset on which it is based. The delta value represents the degree to which the option price will move given a small change in the underlying stock price. For example, an option with a delta of 0.5 will move half a cent for every full cent movement in the underlying stock. A deeply out-of-the-money call will have a delta very close to zero; a deeply in-the-money call will have a delta very close to 1. In the case of a European style option, the delta, or δ, may be calculated using the original Black-Scholes formula:

$$\delta = N\left(\frac{\ln\left(\frac{S}{K}\right) + \left(r + \frac{\sigma^2}{2}\right)(T-t)}{\sigma\sqrt{T-t}}\right),$$

where S is the current underlying asset value, K is the strike price of the option, r is the risk-free rate, σ is the volatility of the underlying asset, T is the time at expiration, t is the current time, and N signifies the cumulative normal distribution. Accordingly, a fund that holds δ (as a fraction of the portfolio) in an underlying risky asset and (1-δ) (i.e., the balance) in a risk-free asset mimics a fund that holds a 100% investment in an option for the underlying risky asset.

To exactly replicate the outcome of an option, however, the fund would need to be traded continuously and cost-free such that the proportion of the fund invested in the risky underlying asset is kept equal to the simulated option's delta value at all times. Embodiments of the invention deviate from these assumptions and instead manage the fund in a way that balances the long-term goal of the fund with its short-term performance. In particular, the following two modifications are made to the theoretical strategy based on option theory:

1. Rebalance periodically (e.g., monthly) instead of continuously.
2. Use a low-risk asset in place of the risk-free asset.

Accordingly, rather than exactly replicating the performance of an option, as discussed above, embodiments of the invention implement an investment strategy that approximates an option payout. This leads to several benefits over a fund that exactly replicates the option.

While rebalancing periodically introduces some additional variance to the final distribution of outcomes, it also considerably reduces complexity and transaction costs. Another benefit of rebalancing less often is that it does not require the same level of liquidity in the low-risk asset as a fund that is continuously rebalanced. Using a low-risk asset instead of a risk-free asset also has benefits, such as avoiding the cash trap that could result by using a risk-free asset. Moreover, the distributions that can be achieved using embodiments of the invention may improve upon the mean return of the low-risk asset employed while simultaneously reducing negative outcomes and creating a positive skew. This is consistent with behavioral finance theory that ascribes a much larger negative utility with losses than positive utility associated with gains, i.e., loss aversion. Accordingly, embodiments of the invention find a compromise between the long-term goal of the fund and short-term investment performance.

FIG. 1 illustrates a process for establishing and managing a target outcome fund in accordance with one embodiment of the invention. The embodiment shown by FIG. 1 includes a series of ordered steps. Some embodiments may perform these steps in parallel, perform the steps in different orders, or perform different steps.

The process begins by choosing 110 an underlying risky asset for the fund based on one or more parameters, such as the volatility, information ratio (IR), and expected return for investment in the risky asset. In option theory, delta is related to volatility but not expected return. Therefore, by choosing 110 a risky asset associated with a high IR and a high expected return, the portion of the fund invested in the risky asset is likely to over-perform relative to the target value set. In various embodiments, the risky asset is chosen 110 manually by a fund manager or automatically by a computer system based on an algorithmic analysis of parameters associated with a plurality of risky assets.

The process continues by choosing 120 a low-risk asset, such as a 1-3 Government/Credit Index fund (1-3 GovCred). As with the risky asset, the low-risk asset may be chosen 120 manually by a fund manager or automatically by a computer system based on an algorithmic analysis of parameters associated with a plurality of low risk assets. In one embodiment, the low-risk asset is a risk-free asset. The choice of a low-risk asset is based on factors including it's the asset's expected risk, expected return, and expected information ratio profile. For two assets with the same amount of expected risk, the asset with a higher expected return is generally more favorable.

The process as illustrated also involves calculating 130 $\delta$ for an option in the chosen underlying risky asset. In one embodiment, the $\delta$ for the underlying risky asset can be calculated 130 using the original Black-Scholes formula, as described above. In other embodiments, other methods of determining $\delta$ are used. One of skill in the art will recognize that many such methods for calculating $\delta$ may be used without deviating from the spirit and scope of this disclosure.

The process continues by setting 140 the initial allocation of the fund between the underlying risky asset and the low-risk asset. The initial allocation is set 140 by considering the calculated value of $\delta$. In one embodiment, the proportion of the fund invested in the underlying asset is $\delta$, with the remainder being invested in the low-risk asset. For example, if $\delta$ is equal to 0.6 for a particular risky asset, then a fund based on the particular risky asset will initially be allocated such that 60% is invested in the risky asset and 40% is invested in the low-risk asset.

The process as illustrated then enters a loop in which a target return is calculated 150, and the allocation of the fund between the underlying risky asset and the low-risk asset is rebalanced 160. In one embodiment, the target return is calculated 150 and the assets rebalanced 160 monthly. In another embodiment, a fund manager chooses when to initiate a cycle of the loop based on fund parameters. In other embodiments, calculation 150 and rebalancing 160 occur in regular cycles of other durations (e.g., weekly, annually, etc.).

In the first iteration of the loop, the target return is calculated 150 based on the historical performance of the low-risk asset and an expected performance for the underlying risky asset. In subsequent iterations, the method for calculating 150 the new target return may depend on the fund's performance since the last target calculation. For example, if the fund underperformed the target return for the previous iteration, the next iteration's target is calculated 150 by applying the expected return rate to the current target. For example, if the current target return represents a growth in value of the fund by 5%, but the fund has failed to achieve this, the new target return is calculated 150 based on the value the fund would have if the target had been met (i.e., 10.25% growth in fund value across the two iterations, or two consecutive iterations of 5% growth).

Conversely, if the current target return is surpassed, the new target return is based on the newly achieved fund value—a so-called "ratchet." In the case of the previous example, where the fund targets 5% growth per iteration, the new target return is calculated 150 to be a 5% growth from the fund's current value. This "ratchet" effect helps protect the fund's gains and improves the distribution of expected outcomes. If a ratchet were not employed and the fund substantially outperformed its targeted return then according to a simple option mimicking strategy it would be nearly fully invested in the underlying risky asset, and therefore at greater risk of losing a significant proportion of its total value.

Figure 2:
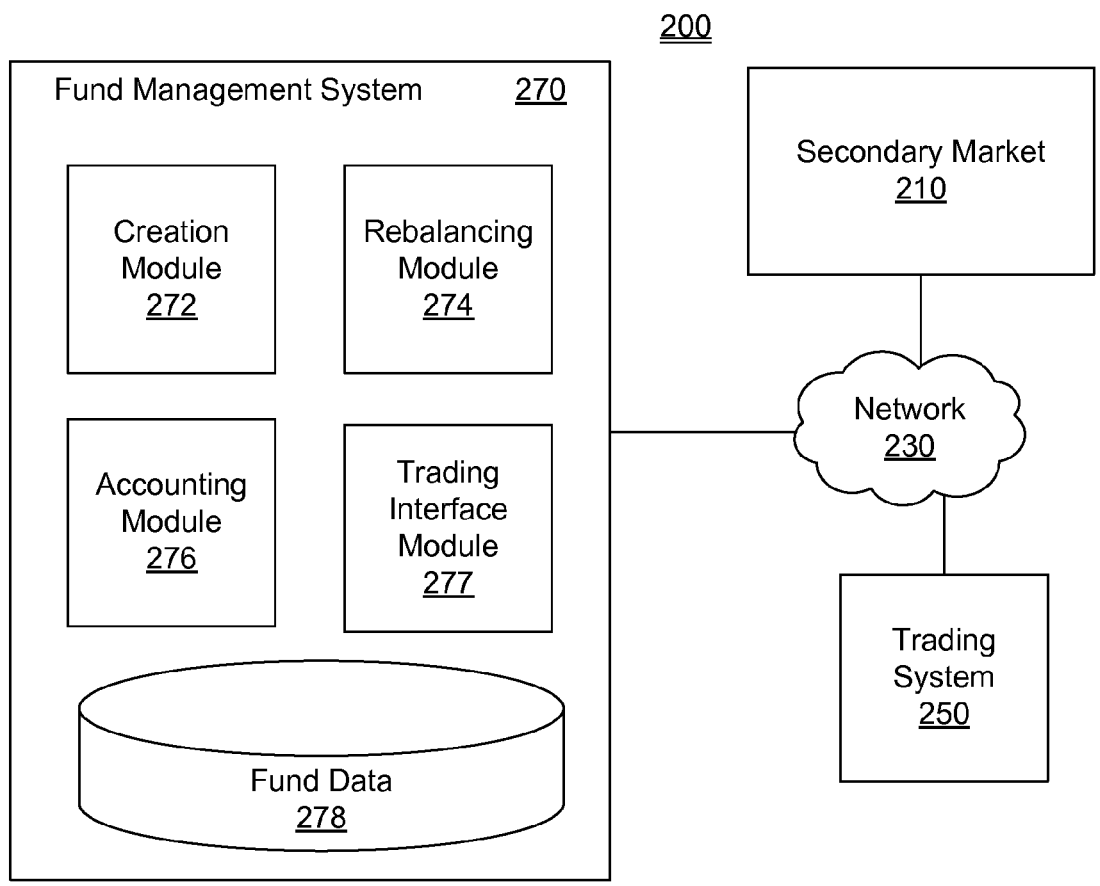
FIG. 2 is a block diagram illustrating a networked system in which a target outcome fund is managed, in accordance with an embodiment.

FIG. 2 illustrates a networked computing environment 200 for performing the process of FIG. 1. As illustrated, the networked computing environment 200 includes a fund management system 270, a trading system 250, and a secondary market 210 (e.g., a stock market), all of which are connected via a network 230. The network 230 is typically the Internet, but may be any network that enables the components of the networked computing environment 200 to communicate, such as a WAN, MAN, LAN, and the like.

The fund management system 270 includes a creation module 272, a rebalancing module 274, an accounting module 276, a trading interface module 277, and a computer readable medium for storing fund data 278. The creation module 272 manages the creation of new funds. In one embodiment, the creation module 270 monitors the trading of potential risky and low-risk assets in a secondary market 210. When a new fund is created, the creation module 272 facilitates the selection (110 and 120) of the assets, calculates 130 the delta for the underlying asset, and determines 140 the initial allocation of the fund between the assets. The creation module 272 interacts with the trading system 250 to obtain the required assets in the secondary market 210.

The rebalancing module 274 is responsible for periodically calculating 150 the fund's target return and rebalancing 160 the allocation of the fund between the risky and low-risk assets. In one embodiment, on a fixed day of each month (e.g., the first Monday), the rebalancing module compares the fund's actual performance with its expected performance to determine a new target return and desired asset balance, as described with reference to FIG. 1 above. Once the new asset balance has been determined, the trading interface module 277 interacts with the trading system 250 to buy and sell assets in the secondary market 210 in order to achieve the desired balance for the fund.

The accounting module 276 tracks the fund's holdings and its investors' shares, and stores this data as part of the fund data 278. In one embodiment, when investors buy and sell shares of the fund in the secondary market 210, the accounting module 276 in notified and records the new share ownership information as part of the fund data 278. In other embodiments, other methods of tracking the fund's holdings and investor information known in the art are used.

Embodiments of the invention described above may be implemented in various types of funds, including mutual funds, grantor trusts, CTFs, and ETFs. Embodiments of the invention may also offer a series of funds, each as described herein, where each fund has a different horizon dates by investing in a horizon fund as the risky asset. The process flow and systems for trading ETFs are described in more detail in U.S. application Ser. No. 12/168,036, filed Jul. 3, 2008, and in U.S. Provisional Application No. 61/142,609, filed Jan. 5, 2009, each of which is incorporated by reference in its entirety.

Figure 3:
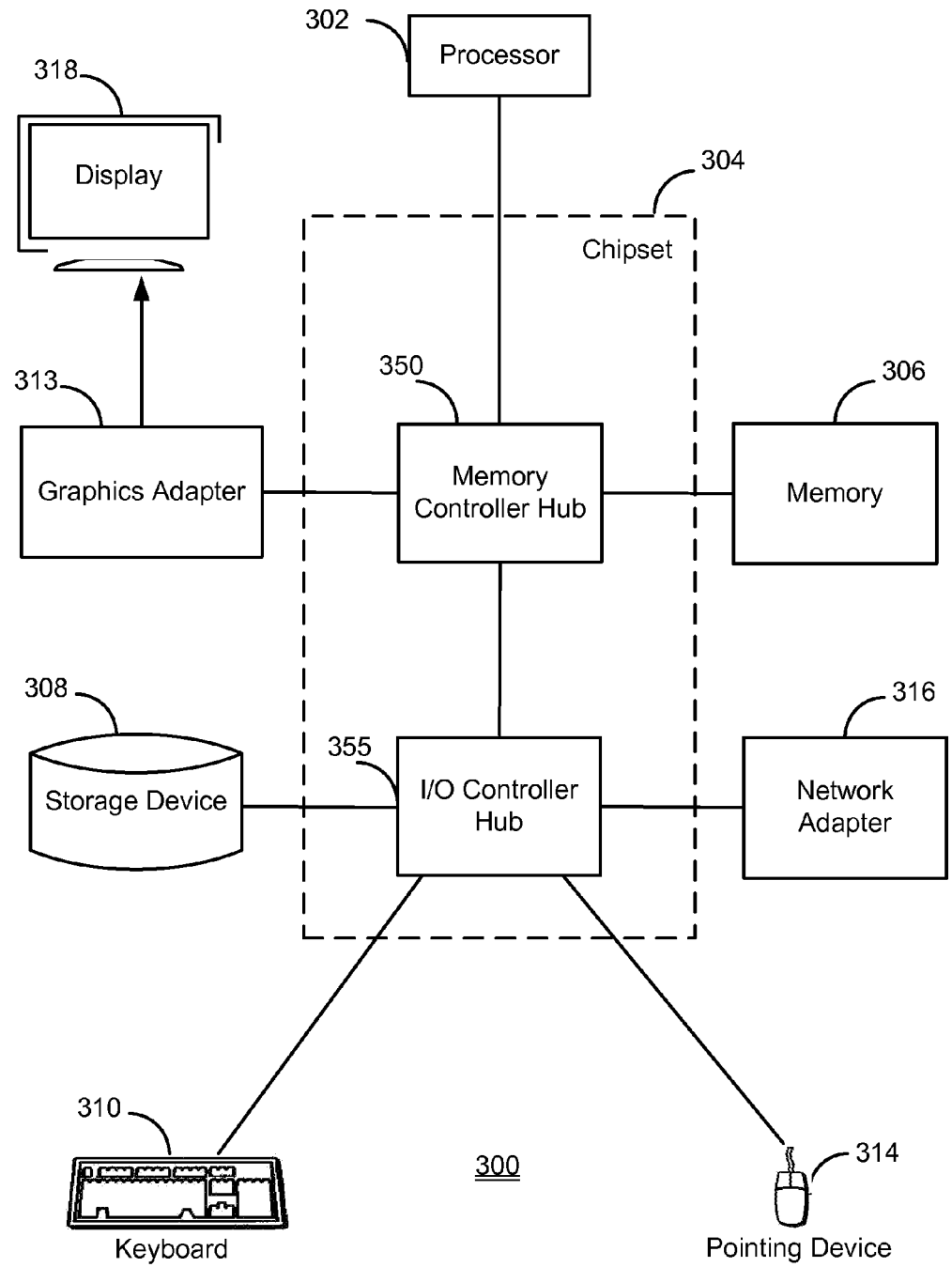
FIG. 3 is a block diagram illustrating an example of a computer for use by the entities in FIG. 2, in accordance with an embodiment.

FIG. 3 is a high-level block diagram illustrating an example of a computer 300 for use by an AP 106, the central intermediary 112 or investors 102, or as part of a management facility for the trust, in accordance with embodiments of the invention. Illustrated are at least one processor 302 coupled to a chipset 304. The chipset 304 includes a memory controller hub 350 and an input/output (I/O) controller hub 355. A memory 306 and a graphics adapter 313 are coupled to the memory controller hub 350, and a display device 318 is coupled to the graphics adapter 313. A storage device 308, keyboard 310, pointing device 314, and network adapter 316 are coupled to the I/O controller hub 355. Other embodiments of the computer 300 have different architectures. For example, the memory 306 is directly coupled to the processor 302 in some embodiments.

The storage device 308 is a computer-readable storage medium such as a hard drive, compact disk read-only memory (CD-ROM), DVD, or a solid-state memory device. The memory 306 holds instructions and data used by the processor 302. The pointing device 314 is a mouse, track ball, or other type of pointing device, and in some embodiments is used in combination with the keyboard 310 to input data into the computer system 300. The graphics adapter 313 displays images and other information on the display device 318. In some embodiments, the display device 318 includes a touch screen capability for receiving user input and selections. The network adapter 316 couples the computer system 300 to the network 301. Some embodiments of the computer 300 have different and/or other components than those shown in FIG. 3.

The computer 300 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 308, loaded into the memory 306, and executed by the processor 302.

The types of computers 300 used by the entities of FIG. 1 can vary depending upon the embodiment and the processing power used by the entity. For example, the fund manager 108 may use a desktop PC, whereas an investor 102 may enter investment decision on a portable device with a small display 318 with touch screen capabilities but lack a keyboard 310 or pointing device 214.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, in situations where the fund over-performs, a mixture of the current target return and current value may be used to determine the new target return, rather than just the current value.

Where specific time frames have been referenced, these represent current best practice with regards to regulation and market expectations. Such time frames should not be considered limiting and are presented purely to illustrate how the current invention can be implemented in current financial markets.

Some portions of this description describe the embodiments of the invention in terms of algorithms and symbolic representations of operations on information. These algorithmic descriptions and representations are commonly used by those skilled in the art to convey the substance of their work effectively to others skilled in the art. These operations, while described functionally, computationally, or logically, may be understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. Such a computer program may be stored in a tangible computer readable storage medium or any type of media suitable for storing electronic instructions. Embodiments of the invention may also relate to an apparatus for performing the operations described herein. This apparatus may be specially constructed for the required purposes, and/or it may comprise a general-purpose computing device selectively activated or reconfigured by a computer program stored in the computer.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

What is claimed is:

1. A method for managing a target outcome fund designed to approximate a performance of an option of a risky asset, the method comprising:

calculating a delta of an option for the risky asset, the risky asset having a high volatility relative to a low-risk asset, wherein the delta is a measure of how a value of the option will move given a change in a value of the risky asset;

determining, by a process executed by a computer processor, a balance between a quantity of the risky asset and a quantity of the low-risk asset, wherein the balance is determined based on the calculated delta to cause a performance of the target outcome fund to approximate a performance of the option for the risky asset;

initiating one or more transactions using a trading system to gain exposure to the risky and low-risk assets by the target outcome fund according to the determined balance between the risky and low-risk assets;

determining an initial target return of the target outcome fund based on an expected performance of the risky and low-risk assets in the target outcome fund;

rebalancing the target outcome fund on a fixed periodic basis by initiating one or more transactions using the trading system to rebalance an allocation between the risky asset and the low-risk asset based on an actual performance of the target outcome fund, the actual performance based on a comparison of a target return and an actual return; and after each rebalancing of the target outcome fund, recalculating the target return of the target outcome fund, the recalculating comprising:

determining a current target return of the target outcome fund;

comparing the actual return of the target outcome fund to the current target return for a period of time preceding the recalculation;

calculating a new target return based on the actual return if the actual return is greater than the current target return; and calculating the new target return based on the current target return if the actual return is less than the current target return.

2. The method of claim 1, wherein the risky asset comprises a diversified global equity market portfolio.

3. The method of claim 1, wherein the risky asset comprises an MSCI ACWI Index Fund.

4. The method of claim 1, wherein the low-risk asset comprises a 1-3 Government/Credit Index fund.

5. The method of claim 1, wherein in a first recalculating cycle the current target return is the initial target return and in subsequent recalculating cycles the current target return is the new target return from a previous recalculating cycle.

6. The method of claim 1, wherein delta is calculated using Scholes-Black formula.

7. The method of claim 1, wherein the rebalancing is performed at least monthly.

8. The method of claim 1, wherein the fund is a retirement account.

9. The method of claim 1, wherein the fund is a college savings account.

10. The method of claim 1, wherein the fund is an exchange traded fund.

11. The method of claim 1, wherein the fund is a grantor trust.

12. The method of claim 1, wherein the fund is a mutual fund.

13. A system for managing a target outcome fund designed to approximate a performance of an option of a risky asset, the system comprising:

a non-transitory memory for storing one or more functional modules;

a processor for performing instructions stored in the memory;

a creation module stored in the memory comprising instructions for:

calculating a delta of an option for the risky asset, the risky asset having a high volatility relative to a low-risk asset, wherein the delta is a measure of how a value of the option will move given a change in a value of the risky asset, and determining a balance between a quantity of the risky asset and a quantity of the low-risk asset, wherein the balance is determined based on the calculated delta to cause a performance of the target outcome fund to approximate a performance of the option for the risky asset;

a trading interface module stored in the memory comprising instructions for communicating with a trading system to initiate one or more transactions using the trading system to gain exposure to the risky and low-risk assets by the target outcome fund according to the determined balance between the risky and low-risk assets; and a rebalancing module stored in the memory comprising instructions for:

determining an initial target return of the target outcome fund based on an expected performance of the risky and low-risk assets in the target outcome fund;

rebalancing the target outcome fund on a fixed periodic basis by initiating one or more transactions using the trading system to rebalance an allocation between the risky asset and the low-risk asset based on an actual performance of the target outcome fund, the actual performance based on a comparison of a target return and an actual return; and after each rebalancing of the target outcome fund, recalculating the target return of the target outcome fund, the recalculating comprising:

determining a current target return of the target outcome fund;

comparing the actual return of the target outcome fund to the current target return for a period of time preceding the recalculation;

calculating a new target return based on the actual return if the actual return is greater than the current target return; and calculating the new target return based on the current target return if the actual return is less than the current target return.

14. The system of claim 13, further comprising:

an accounting module stored in the memory comprising instructions for maintaining a record of assets held by the target outcome fund by monitoring transactions with the trading system.

15. The system of claim 14, wherein the accounting module is further comprises instructions for:

receiving notifications of transactions including shares of the target outcome fund in a secondary market; and updating a record of ownership of shares of the target outcome fund based on the notifications.

16. The system of claim 13, wherein in a first recalculating cycle the current target return is the initial target return and in subsequent recalculating cycles the current target return is the new target return from a previous recalculating cycle.

* * * * *

UNITED STATES PATENT AND TRADEMARK OFFICE
CERTIFICATE OF CORRECTION

PATENT NO. : 8,838,494 B2  
APPLICATION NO. : 13/460562  
DATED : September 16, 2014  
INVENTOR(S) : Matthew Arnold O'Hara and Wei Li Page 1 of 1

It is certified that error appears in the above-identified patent and that said Letters Patent is hereby corrected as shown below:

In the Claims

Column 8, line 47-48, after "module" delete "is"

Signed and Sealed this
Twenty-ninth Day of December, 2015

Michelle K. Lee
*Director of the United States Patent and Trademark Office*